United States Patent
Danko et al.

(10) Patent No.: US 11,174,847 B2
(45) Date of Patent: Nov. 16, 2021

(54) SYSTEM AND METHOD FOR WIND BLADE INSPECTION, REPAIR AND UPGRADE

(71) Applicant: General Electric Company, Schenectady, NY (US)

(72) Inventors: Todd William Danko, Niskayuna, NY (US); Shiraj Sen, Clifton Park, NY (US); John Robert Hoare, Latham, NY (US); Charles Burton Theurer, Alplaus, NY (US); Douglas Forman, Niskayuna, NY (US); Judith Ann Guzzo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 16/192,810

(22) Filed: Nov. 16, 2018

(65) Prior Publication Data

US 2020/0158094 A1 May 21, 2020

(51) Int. Cl.
*F03D 80/50* (2016.01)
*F03D 17/00* (2016.01)
(Continued)

(52) U.S. Cl.
CPC ............ *F03D 80/50* (2016.05); *F03D 17/00* (2016.05); *B25J 9/1674* (2013.01); *B25J 19/02* (2013.01);
(Continued)

(58) Field of Classification Search
CPC .. F03D 80/50; F03D 17/00; F05D 2270/8041; F05D 2270/821;
(Continued)

(56) References Cited

U.S. PATENT DOCUMENTS 6,890,152 B1    5/2005   Thisted
8,171,809 B2    5/2012   Fritz
(Continued)

FOREIGN PATENT DOCUMENTS

CN    105 774 934 A      7/2016
DE    102008019680 A1    11/2009
(Continued)

OTHER PUBLICATIONS

EPO Search Report, dated Mar. 27, 2020.
(Continued)

*Primary Examiner* — Robert R Raevis
(74) *Attorney, Agent, or Firm* — Dority & Manning, P.A.

(57) ABSTRACT

A method including positioning a modular robotic component proximate an area of interest on a surface of a wind turbine. The modular robotic component including a plurality of modules that perform a plurality of tasks. The method further including inspecting the area of interest with the modular robotic component for an indication requiring at least one of repair or upgrade and operating the modular robotic component to perform the plurality of tasks sequentially as the modular robotic component moves along the surface of the wind turbine. A modular robotic component and system including the modular robotic component are disclosed.

21 Claims, 5 Drawing Sheets

(51) Int. Cl.
*B25J 9/16* (2006.01)
*B25J 19/02* (2006.01)
*G05B 19/042* (2006.01)

(52) U.S. Cl.
CPC .. *F05D 2270/8041* (2013.01); *G05B 19/0426* (2013.01); *G05B 2219/2619* (2013.01)

(58) Field of Classification Search
CPC ............. F05D 2270/336; B25J 9/1674; G05B 2219/2619; G05B 19/0426
USPC ......... 73/596–602, 627–631, 865.8; 415/118
See application file for complete search history.

(56) References Cited

U.S. PATENT DOCUMENTS

| | | | |
|---|---|---|---|
| 8,270,667 B2 | 9/2012 | Fritz et al. | |
| 8,281,442 B2 | 10/2012 | Eggleston | |
| 9,330,449 B2 | 5/2016 | Newman | |
| 9,610,739 B2 | 4/2017 | Haag et al. | |
| 2008/0141778 A1* | 6/2008 | Bosselmann | G01N 29/4427 |
| | | | 73/633 |
| 2012/0103705 A1 | 5/2012 | Schlee et al. | |
| 2015/0267688 A1 | 9/2015 | Krampe | |
| 2019/0186470 A1* | 6/2019 | Georgeson | B65G 17/12 |
| 2020/0063717 A1* | 2/2020 | Georgeson | G01N 29/225 |
| 2020/0318619 A1* | 10/2020 | Laurberg | B25J 11/008 |

FOREIGN PATENT DOCUMENTS

| | | |
|---|---|---|
| KR | 2014 0002125 A | 1/2014 |
| WO | 2011161740 A1 | 12/2011 |
| WO | WO 2012/158042 A1 | 11/2012 |
| WO | 2018010749 A1 | 1/2018 |

OTHER PUBLICATIONS

Jeon et al., "Maintenance robot for wind power blade cleaning", 29th International Symposium of Automation and Robotics in Construction, ISARC 2012, Eindhoven, Netherlands, Dec. 1, 2012.
S.Hayashi et al., "Moving mechanism for a wind turbine blade inspection and repair robot", 2017 IEEE/SICE International Symposium on System Integration (SII), Taipei, pp. 270-275, Dec. 2017.
"Robot for the Inspection of Wind Turbine Rotor Blades (RIWEA)",Research and Development in Robotic Systems, Retrieved from: https://www.iff.fraunhofer.de/en/business-units/robotic-systems/riwea.html, on Aug. 24, 2018.

* cited by examiner

SYSTEM AND METHOD FOR WIND BLADE INSPECTION, REPAIR AND UPGRADE

BACKGROUND

The embodiments described herein relate generally to wind turbines, and more specifically, to systems and methods for inspecting, repairing and/or upgrading wind turbines.

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy to turn a shaft coupling the rotor blades to a gearbox, or if a gearbox is not used, directly to the generator. The generator then converts the mechanical energy to electrical energy that may be deployed to a utility grid.

Wind turbine blades are typically precisely designed and manufactured to efficiently transfer wind energy into rotational motion, thereby providing the generator with sufficient rotational energy for power generation. Blade efficiency is generally dependent upon blade shape and surface smoothness. Unfortunately, during operation, debris (e.g., dirt, bugs, sea salt, etc.) is collected on the blades, thereby altering the shape and degrading the smoothness. In addition, rocks or other fragments may scratch or erode the blades upon contact. Furthermore, the presence of leading edge erosion and lightning damage may affect blade shape and surface smoothness, thus having an impact on blade efficiency.

Therefore, regular inspection, repair and/or performance upgrades, such as providing protection to the blades in the form of protective coatings, tapes or caps, may serve to maintain wind turbine efficiency. Typically, blade inspection, repair and/or upgrading is performed manually by via rope access, baskets or cranes. For example, using ropes, a blade technician is hoisted to a position adjacent to each blade via suspension from the tower, the hub, or a proximately located crane. The person then inspects, cleans, provides upgrading and/or repairs the blade. For example, the person may take pictures of the blades for later analysis or perform additional tests to determine a current condition of the blade surface. In addition, the person may proceed with any repair or upgrading deemed necessary. However, manual blade maintenance is time consuming and expensive, and is therefore generally performed at longer than desired time intervals. Consequently, wind turbines may operate in an inefficient manner for significant periods. In addition, environmental conditions may preclude the ability for humans to access the wind turbine to perform such tasks.

Accordingly, there is a need for a system and method for inspection, repair and/or upgrade of a wind turbine that requires minimal human intervention. Additionally, an inspection, repair and/or upgrade system and method that can perform in a wide variety of environmental conditions would be desired. Further, there is a need for a system and method for inspection, repair and/or upgrade of a wind turbine that are relatively fast and efficient.

BRIEF DESCRIPTION

Aspects and advantages of the disclosure are set forth below in the following description, or may be obvious from the description, or may be learned through practice of the disclosure.

In one aspect, a method is provided. The method including positioning a modular robotic component proximate an area of interest on a surface of a wind turbine. The modular robotic component comprising a plurality of modules that perform a plurality of tasks. The method further including inspecting the area of interest with the modular robotic component for an indication requiring at least one of repair or upgrade and operating the modular robotic component to perform the plurality of tasks sequentially as the modular robotic component moves along the surface of the wind turbine.

In another aspect, a system is provided. The system includes one or more cables positioned in draping engagement with a portion of a wind turbine, each of the one or more cables anchored to a base location at opposing ends and a modular robotic component configured to ascend the one or more cables to a position proximate an area of interest on a surface of the wind turbine. The modular robotic component includes an access module, an inspection module coupled to the access module and at least one additional module coupled to the inspection module. The access module includes a drive mechanism to drive the modular robotic component along the surface of a wind turbine. The inspection module includes one or more sensors to inspect the surface of the wind turbine and validate the area of interest on the surface of the wind turbine. Each module of the at least one additional module is configured to perform a task. The access module, the inspection module and the at least one additional module are cooperatively engaged to enable movement along the surface of the wind turbine to sequentially perform the tasks at an indication.

In yet another aspect, a modular robotic component is disclosed. The modular robotic component includes an access module, an inspection module coupled to the access module and at least one additional module coupled to the inspection module. The access module includes a drive mechanism to drive the modular robotic component along the surface of a wind turbine. The inspection module includes one or more sensors to inspect the surface of the wind turbine and validate the area of interest on the surface of the wind turbine. Each module of the at least one additional module is configured to perform a task. The access module, the inspection module and the at least one additional module are cooperatively engaged to enable movement along the surface of the wind turbine to sequentially perform the tasks at an indication.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Corresponding reference characters indicate corresponding parts throughout the several views of the drawings.

DETAILED DESCRIPTION OF THE DISCLOSURE

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may minimize the need for human intervention in the inspection, repair and/or upgrade of wind turbines. As a result, the disclosed modular robotic component, system and method may significantly lower costs by enabling certain inspection, repair and/or upgrade operations to be robotically performed.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land-based wind turbine, for purposes of illustration, one of ordinary skill in the art will readily appreciate that embodiments of the present disclosure may be applied to any wind turbine structure, such as offshore wind turbines, and is not intended to be limiting to land based structures.

Figure 1:
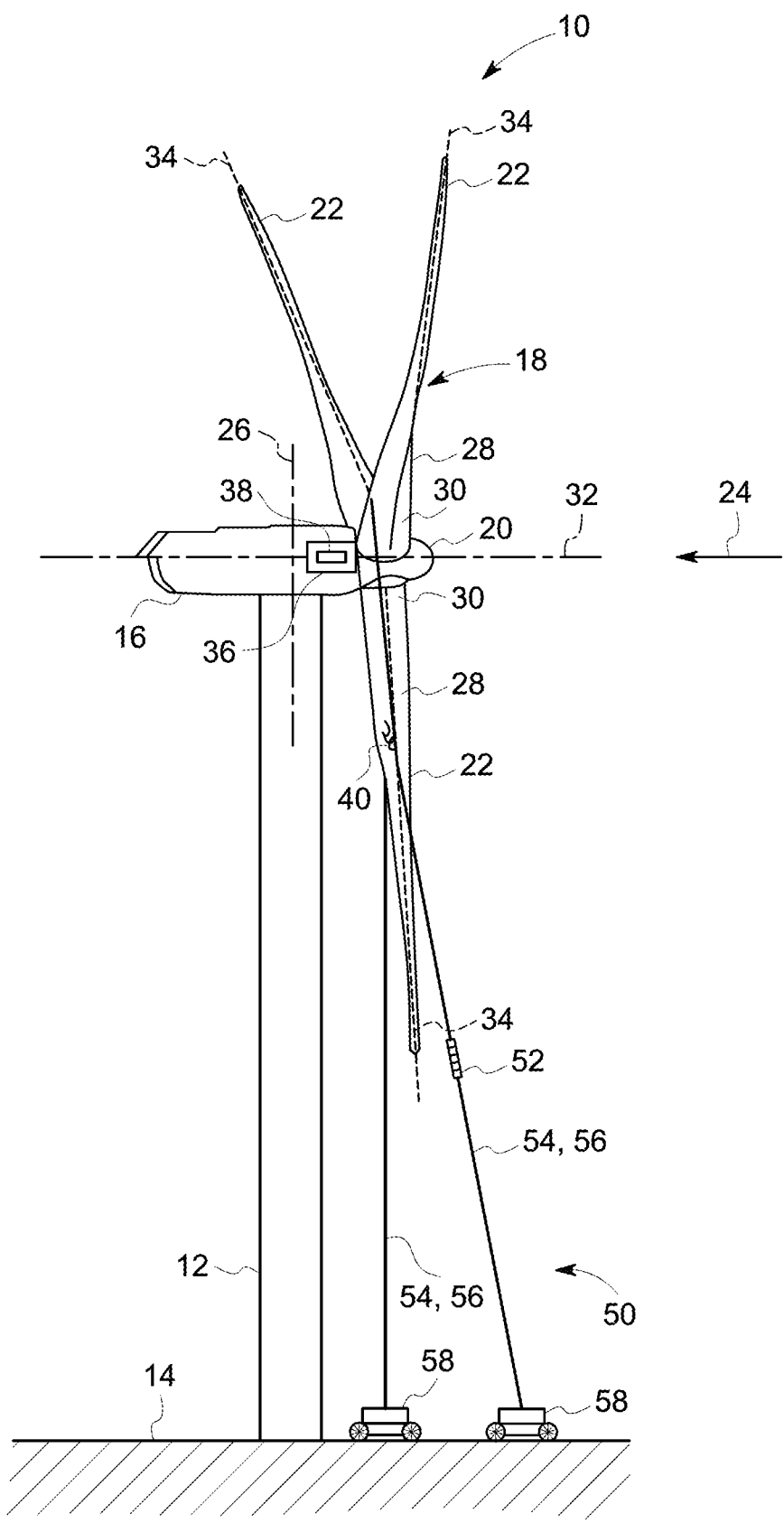
FIG. 1 is a side schematic view of an exemplary wind turbine including a system for wind blade inspection, repair and upgrade, in accordance with one or more embodiments of the present disclosure.

Referring now to the drawings, wherein identical numerals indicate the same elements throughout the figures, FIG. 1 provides a schematic side view of an exemplary wind turbine 10. In the exemplary embodiment, wind turbine 10 is a horizontal-axis wind turbine. Alternatively, the wind turbine 10 may be a vertical-axis wind turbine. In the exemplary embodiment, the wind turbine 10 includes a tower mast 12 extending from and coupled to a supporting surface 14. The tower mast 12 may be coupled to the supporting surface 14 with a plurality of anchor bolts or via a foundation mounting piece (neither shown), for example. A nacelle 16 is coupled to the tower mast 12, and a rotor 18 is coupled to the nacelle 16. The rotor 18 includes a rotatable hub 20 and a plurality of rotor blades 22 coupled to the hub 20. In the exemplary embodiment, the rotor 18 includes three rotor blades 22. Alternatively, the rotor 18 may have any suitable number of rotor blades 22 that enables the wind turbine 10 to function as described herein. The tower mast 12 may have any suitable height and/or construction that enables the wind turbine 10 to function as described herein.

The rotor blades 22 are spaced about the rotatable hub 20 to facilitate rotating the rotor 18, thereby transferring kinetic energy from a wind force 24 into usable mechanical energy, and subsequently, electrical energy. The rotor 18 and the nacelle 16 are rotated about the tower mast 12 on a yaw axis 26 to control a perspective, or azimuth angle, of the rotor blades 22 with respect to the direction of the wind 24. The rotor blades 22 are mated to the hub 20 by coupling a blade root portion 28 to the rotatable hub 20 at a plurality of load transfer regions 30. Each load transfer region 30 has a hub load transfer region and a blade load transfer region (both not shown in FIG. 1). Loads induced to the rotor blades 22 are transferred to the hub 20 via load the transfer regions 30. Each rotor blade 22 also includes a blade tip 32.

In the exemplary embodiment, the rotor blades 22 have a length of between approximately 30 meters (m) (99 feet (ft)) and approximately 120 m (394 ft). Alternatively, the rotor blades 22 may have any suitable length that enables the wind turbine 10 to function as described herein. For example, the rotor blades 22 may have a suitable length less than 30 m or greater than 120 m. As wind 24 contacts the rotor blade 22, blade lift forces are induced to the rotor blade 22 and rotation of the rotor 18 about an axis of rotation 32 is induced as the blade tip 22 is accelerated.

As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position. A pitch angle (not shown) of the rotor blades 22, i.e., an angle that determines the perspective of the rotor blade 22 with respect to the direction of the wind 24, may be changed by a pitch assembly (not shown in FIG. 1). Increasing a pitch angle of rotor blade 22 decreases blade deflection by reducing aero loads on the rotor blade 22 and increasing an out-of-plane stiffness from the change in geometric orientation. The pitch angles of the rotor blades 22 are adjusted about a pitch axis 34 at each rotor blade 22. In the exemplary embodiment, the pitch angles of the rotor blades 22 are controlled individually. Alternatively, the pitch angles of the rotor blades 22 are controlled simultaneously as a group.

During operation of wind turbine 10, the pitch assembly may change the pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 38 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

The wind turbine 10 of the present disclosure may, during fabrication, assembly, operation, or otherwise, incur various indications. An indication 40 may be, for example, a crack, erosion, fouling, lightening damage or other defect on a surface of the wind turbine 10, such as in a rotor blade 22, tower 12, or other component of the wind turbine 10. The indication 40, if not recognized and repaired, or the blade, or portions thereof, upgraded, may cause damage to the various components of the wind turbine 10 or cause them to fail. For example, indications 40 in high load areas of the rotor blades 22 may, in some instances, need to be repaired before growing past approximately 50 millimeters ("mm") in length, while indications 40 in low load areas of the rotor blades 22 may need to be repaired before growing past approximately 3 meters ("m") in length.

Figure 2:
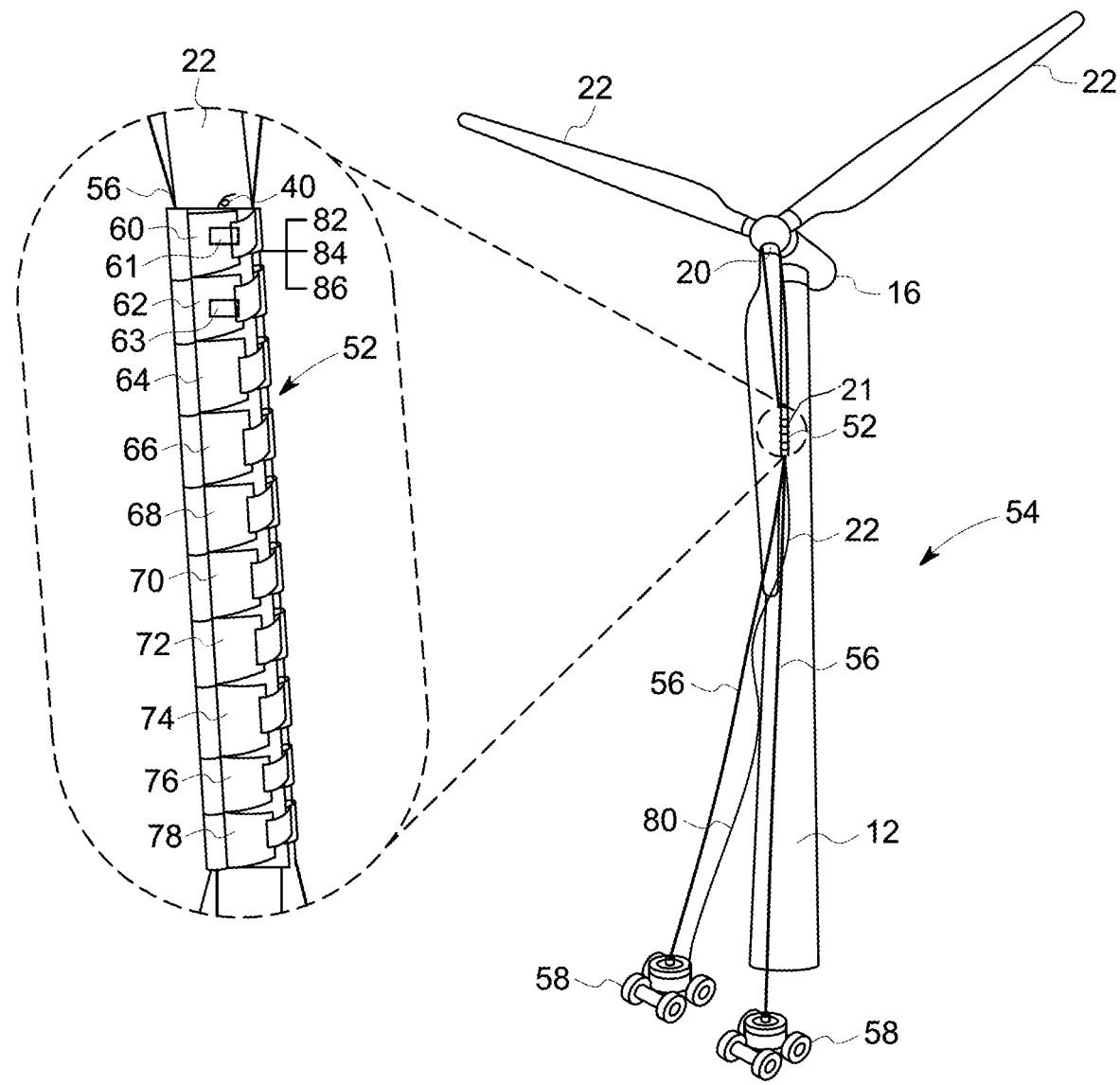
FIG. 2 is a perspective view of the system for wind blade inspection, repair and upgrade during use including an enlarged portion illustrating the modular robotic component, in accordance with one or more embodiments of the present disclosure.
Figure 3:
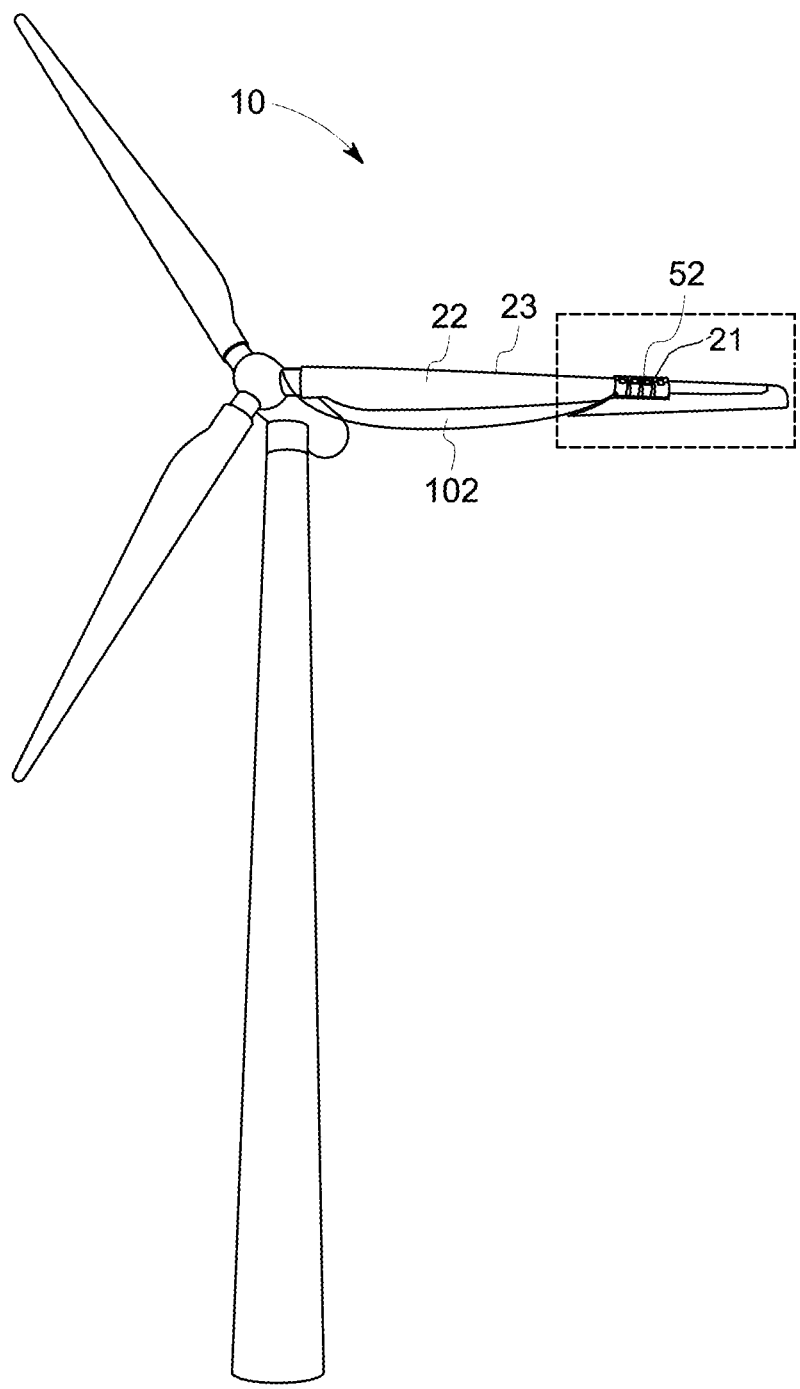
FIG. 3 is a perspective view of another embodiment of a wind turbine including a system for wind blade inspection, repair and upgrade, in accordance with one or more embodiments of the present disclosure.
Figure 4:
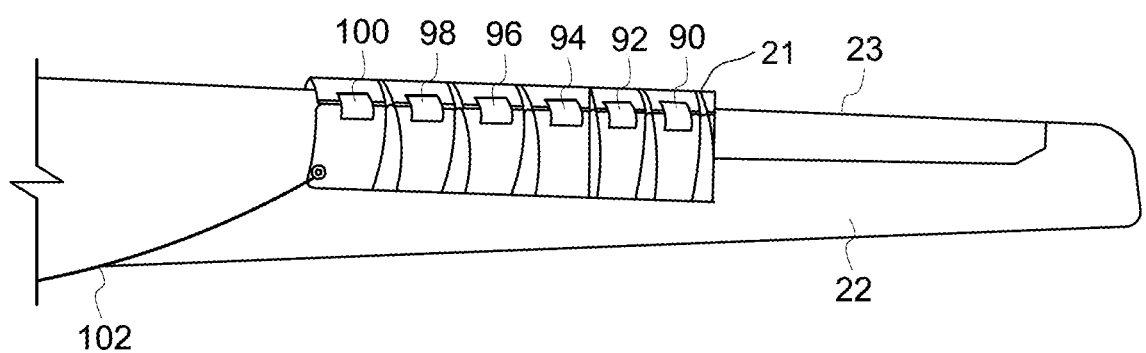
FIG. 4 is an enlarged view of a portion of the system for wind blade inspection, repair and upgrade of FIG. 3, as indicated by dashed line, in accordance with one or more embodiments of the present disclosure.

To provide such inspection for indications, repair of indications and/or upgrade to the wind turbine, disclosed herein is a modular robotic component 52 and a system 50 that provides for use of the modular robotic component 52 to access the blade 22 or other part of the wind turbine 10. In the embodiment of FIGS. 1 and 2, the system 50 utilizes a vertical, external, rappelling system to position the modular robotic component 52 proximate the blade 22. In the embodiment of FIGS. 3 and 4, the modular robotic component 52 is positioned proximate the wind turbine 10, and more particularly, the blade 22 utilizing manual positioning, or any other suitable means of positioning.

As illustrated in FIG. 1, in one embodiment the system 50 includes a vertical, external, rappelling system 54 to position the modular robotic component 52 proximate the blade 22. The vertical, external, rappelling system 54 is generally comprised of one or more cables 56, to position the modular robotic component 52 at the location for inspection, repair and/or upgrade of the indication 40. In this particular embodiment, the modular robotic component 52 is configured to climb the vertical, external, rappelling system 54. One or more coordinated base located robots 58 running in slave mode ensure that the modular robotic component 52 is able to apply the right contact forces at the right position to ensure task performance. The system 50 may perform a variety of tasks to provide fast, efficient, accurate inspection, repair and/or upgrade of the wind turbine 10. Such tasks may include, but are not limited to, real-time inspection, cleaning, sanding, grinding, coating application, filler application, tape application, or the like.

In an embodiment, the system 50 may include initial deployment of one or more pilot lines (not shown) to aid in placement of the vertical, external, rappelling system 54. In an alternative embodiment, the system 50 may include initial deployment of the one or more cables 56 on the wind turbine 10, that form the vertical, external, rappelling system 54, without the use of pilot lines, and more particularly utilizing a delivery component such as an unmanned aerial vehicle (UAV), and more particularly a drone, a balloon, such as, but not limited to, a helium balloon, a hot air balloon, a hydrogen balloon, a ballistic mechanism, a catapult, or any other delivery component that is capable of deploying the one or more pilot lines or the one or more cables 56 relative to the wind turbine 10. By positioning the cables 56 about a component of the wind turbine 10 in such a manner, and by doing so through the use of the delivery component (not shown), human intervention in the form of a climber that anchors the one or more cables 56 to the wind turbine 10, such as to the top of the nacelle 16, is not required. The one or more cables 56 are configured to traverse the wind turbine 10 in draping engagement. For example, in one embodiment, the one or more cables 56 may be configured to traverse the hub 20 or any other components of the wind turbine 10, such as the rotor blades 22 or the nacelle 16. In an embodiment, after positioning the one or more cables 56 as desired, the one or more cables 56 are anchored to the one or more coordinated base located robots 58. Further information regarding the inclusion of the vertical, external, rappelling system 54 are disclosed in copending patent application, entitled, "SYSTEM AND METHOD FOR WIND BLADE INSPECTION, REPAIR AND UPGRADE", filed on the same day herewith, and assigned to the same assignee as here, which application is incorporated herein by reference in its entirety.

As illustrated in FIG. 1, in this particular embodiment, the modular robotic component 52 ascends the vertical, external, self-rappelling system 54, and more particularly, the one or more cables 56 to the portion of the wind turbine 10, such as the blade 22, where the indication 40 is present. As the modular robotic component 52 ascends, the one or more cables 56 are modulated, such as by adjusting tension on the cables to produce desirable forces through pulling, moving, steering, or the like, using the one or more coordinated base located robots 58 as a slave-system to assist in positioning the modular robotic component 52 proximate the blade 22, and more particularly, the indication 40 on the blade 22. In an alternate embodiment, the one or more cables 56 are modulated using a manually driven ground base system.

As illustrated by enlargement in FIG. 2, the modular robotic component 52 is comprised of a plurality of modules 60, 62, 64, 66, 68, 70, 72, 74, 76, 78 coupled one to another to form a train-like structure. It should be understood that although nine modules are illustrated in the figures, any number of modules required to perform the tasks may be included in the modular robotic component 52. It should further be understood that although the plurality of modules 60, 62, 64, 66, 68, 70, 72, 74, 76, 78 are illustrated as substantially the same shape and size, varying shapes and sizes may be included to form the modular robotic component 52.

In an embodiment, the modular robotic component 52 is comprised of at least two modules. Each of the modular robotic components 60, 62, 64, 66, 68, 70, 72, 74, 76, 78 is configured to perform a task, or a combination of tasks, that relate to inspection, repair and/or upgrade of the wind turbine blade 22. Such tasks may include, but are not limited to, inspection, various repairs including application of filler material(s), coating(s), tape(s), or the like. The modular robotic component 52 is reconfigurable based on the task at hand. In an embodiment, an inspector or repair crew member can remotely monitor and control the modular robotic component 52 to assist with the required task at hand (e.g. repair).

In the embodiment of FIG. 2, the modular robotic component 52, comprised of a first module 60, a second module 62, a third module 64, a fourth module 66, a fifth module 68, a sixth module 70, a seventh module 72, an eighth module 74, a ninth module 76 and a tenth module 78 is configured to provide for inspection, repair and application of a coating. More particularly, subsequent to positioning proximate the wind turbine 10, and in this particular embodiment the blade 22, the modular robotic component 52 traverses the blade 22 in a continuous or incremental manner dependent upon the task being performed. The modular robotic component 52 inspects an area of interest 21 on the surface of the blade 22 for any indications 40, such as damage to the blade surface due to normal wear and tear or abnormal wear and tear, such as indications as a result of a lightning strike, etc. During the inspection process, the first module 60 provides access and mobility to the surface the blade 22, and more particularly to the area of interest in need of upgrade and/or repair. The first module 60 will always be present as an access module, and subsequent interchangeable modules will follow the access module. The first, or access, module 60 may include a built-in camera 61 for positioning and a drive mechanism (described presently) to provide movement along the wind turbine surface. As the modular robotic component 52 progresses along the surface of the blade 22, the second module 62 provides inspection of the surface of the blade 22 to validate the area for repair and/or upgrade or determine the need to repair, monitor the area during upgrade or repair and to validate the repair/upgrade is complete at the end of the process. In an embodiment, the second module 62 may comprise one or more sensors 63 that utilize visual sensing or ultrasonic-based non-destructive testing (NDT) to provide such inspection. As the modular robotic component continues to progress along the surface of the wind turbine 10, and as illustrated the blade 22, the third module 64 is positioned proximate the identified indication 40 and provides cleaning of the area. As the third module 64 is cleaning, the second module 62 may be inspecting another area of interest on the surface of the blade 22 and identifying additional indications 40 in need of repair or the like. As the modular robotic component 52 continues to progress along the surface of the blade 22, the fourth module 66 performs sanding of the area of interest 21. The modular robotic component 52 continues progressing along the surface of the blade 22 in a manner to position the fifth module 68 proximate the now sanded area of interest 21 and provide an additional cleaning step to the area of interest 21. The modular robotic component 52 continues progressing along the surface of the blade 22 in a manner to position the sixth module 70 proximate the now sanded and cleaned area of interest 21 and deposits a filler material or coating in the identified indication 40 (crack, hole, etc.). The modular robotic component 52 continues progressing along the surface of the blade 22 in a manner to position the seventh module 72 proximate the now filled identified indication 40 and provides curing of the filler material, and or subsequent steps to the surface of the blade 22. As the seventh module 72 is curing the deposited fill material, the upstream modules, and more specifically the first module 60, the second module 62, the third module 64, the fourth module 66, the fifth module 68, and the sixth module 70 may be inspecting, identifying, cleaning, sanding and filling yet another location on the surface of the blade 22. As the modular robotic component 52 continues to progress, the eighth module 74 is positioned proximate the now filled and cured indication 40 and may provide a final shaping (e.g. sanding) of the filled area. As the modular robotic component 52 continues to progress along the surface of the blade 22, the ninth module 76 is positioned proximate the now filled, cured and shaped area of interest 21, and provides for deposition of an optional coating material to the filled area of interest 21. Finally, as the modular robotic component 52 continues to progress along the surface of the blade 22, the tenth module 78 is positioned proximate the area of interest 21 and provides for the application of a tape along the surface of the blade. As previously mentioned, the progression of the modular robotic component 52 via the first module 60 to align each module proximate the indication 40 provides for continued inspection by the second module 62, cleaning by the third module 64, sanding by the fourth module 66, cleaning by the fifth module 68, deposition of fill material by the sixth module 70, curing of the fill material by the seventh module 72, final shaping by the eight module 74, coating by the ninth module 76 and tape application by the tenth module 78 at locations proximate each module 60, 62, 64, 66, 68, 70, 72, 74, 76, 78. In an embodiment, the modular robotic component 52 moves at a consistent velocity, resulting in a complete repair by the time the modular robotic component 52 leaves the area of interest 21 on the surface of the blade 22.

At a given time, each module 60, 62, 64, 66, 68, 70, 72, 74, 76, 78 is performing a task on a different location on the blade 22, but as the modular robotic component 52 moves, each module 60, 62, 64, 66, 68, 70, 72, 74, 76, 78 visits the entire area of interest 21. As a result, the repair and/or upgrade process is continuous, as opposed to piecewise. It should be understood that as previously described, the modular robotic component 52 traverses the blade 22 in a continuous or incremental manner dependent upon the task being performed. More specifically, while the movement is described as continuous, versus piece-wise, instances in which a portion of the blade requires a longer length of time in which to inspect, repair and/or upgrade may require the modular robotic component 52 to pause, as if to move incrementally, so as to properly complete the task. This is not intended to include step-wise movement whereby the modular robotic component 52 is stopped and moved to another area to complete a task.

It should be understood that while specific tasks have been identified in the previous description, the tasks performed by the modular robotic component 52 as identified with respect to FIG. 2 are merely exemplary, and are not intended to be limiting, or indicate performance in a specific order. As intended, any number of tasks in any sequential order may be performed by the modular robotic component 52 as required.

In an embodiment, the first module 60 may further comprise a drive mechanism 82. The drive mechanism 82 may be configured to drive the modular robotic component 82. For example, the drive mechanism 82 may be coupled to a traction apparatus 84, and may drive the traction apparatus 84, causing the first module 60, and in response the complete modular robotic component 52, to traverse the surface of the wind turbine 10 and/or the vertical, external, self-rappelling system 54. Alternatively, the drive mechanism 82 may be independent of the traction apparatus 84 and may independently cause the first module 60, and in response the complete modular robotic component 52, to traverse the surface of the wind turbine 10 and/or the vertical, external, self-rappelling system 54. The drive mechanism 82 may be, for example, a direct drive mechanism including a motor, or may include a gearbox, belt, chain, rack and pinion system, or any other suitable drive component.

As illustrated in FIG. 2, in an embodiment, the modular robotic component 52 may be tethered to the base location with a tether cable 80 configured to provide one or more of power, communications, grounding, supplies, distance calculation from a specific point, such as a root of blade, or the like. More particularly, the tether cable 80 may provide any suitable components or systems for operating the modular robotic component 52.

Subsequent to reaching the desired location for inspection, repair or upgrade of the blade 22, the modular robotic component 52 performs one or more tasks in the area of interest 21. In an embodiment, during this task performance the modular robotic component 52 is configured to perform continuous or incremental movement along the blade 22 via the first module 60, and more particularly the drive mechanism 82 and the traction apparatus 84. Upon completion of the inspection, repair and/or upgrade of the wind turbine 10, the modular robotic component 52 descends the vertical, external, self-rappelling system 54, and more particularly, the one or more cables 56. Similar to during the ascending of the modular robotic component 52, the one or more cables 56 are modulated using the one or more coordinated base located robots 58, as a slave-system to assist the modular robotic component 52 or manually modulated as previously described. The modular robotic component 52 is subsequently removed from the wind turbine 10 and the one or more cables 56 are removed from the wind turbine 10 in a simple pulling action by the one or more coordinated base located robots 58 or human intervention.

The modular robotic component 52 and/or the one or more coordinated base located robots 58 may further include a processor 86 for operating the modular robotic component 52. The modular robotic component 52, such as the drive mechanism 82, the traction apparatus 84, and/or any other components or systems of the modular robotic component 52, may be communicatively coupled to the processor 86. The communicative coupling of the various components of the modular robotic component 52 and the processor 86 may be through a physical coupling, such as through a wire or other conduit or umbilical cord, including tether cable 80, or may be a wireless coupling, such as through an infra-red, cellular, sonic, optical, or radio frequency-based coupling. In an embodiment, the processor 86 may be incorporated into a suitable control system (not shown), such as a handheld remote, a personal digital assistant, cellular telephone, a separate pendant controller, or a computer. The modular robotic component 52 may be operated manually through the processor 86 by a human operator or may be partially or fully automated through the use of suitable programming logic incorporated into the processor 86.

The modular robotic component 52 may be configured to inspect for indications 40 and/or repair indications 40, provide upgrades to the blades 22, and any other wind turbine 10 components, such as the tower 12. For example, in an exemplary embodiment, the modular robotic component 52 may traverse the wind turbine 10 via the vertical, external, self-rappelling system 54, to a blade 22 and inspect the blade 22 for indications 40. The modular robotic component 52 may thereafter perform task to repair the indication 40 and/or report the indication 40 for future repair.

In an embodiment, the modular robotic component 52 may include any variety of modules for inspecting, repairing and/or upgrading the wind turbine 10. For example, the modular robotic component 52 may, in exemplary embodiments, include a locating apparatus to determine the location of an indication 40 detected on the rotor blade 22 by providing information regarding the location of the modular robotic component 52 when the indication 40 is detected, and converting this information to information regarding the respective location of the indication 40 along the length of the rotor blade 22. The modular robotic component 52 may, in exemplary embodiments, include a measuring apparatus configured to measure the size of any indications 40 detected on the wind turbine 10, such as on a rotor blade 22. The modular robotic component 52 may, in exemplary embodiments, include a metering device. The metering device may indicate the distance that the modular robotic component 52 is from the rotatable hub 20, the ground, or any other wind turbine 10 component, when the indication 40 is detected. The modular robotic component 52 may, in exemplary embodiments, include a global positioning system ("GPS") device or transmitter configured to utilize location data to determine the location of the modular robotic component 52, when the indication 40 is located.

In an exemplary embodiment, the vertical, external, self-rappelling system 54 of the present disclosure may include safety features connecting the modular robotic component 52 to the wind turbine 10 or tether cable 80. In the event that the modular robotic component 52, while traversing the vertical, external, self-rappelling system 54, loses traction and becomes disengaged from the wind turbine 10, and/or the cables 56, the safety features may prevent the modular robotic component 52 from falling to the ground and becoming damaged or broken, a safety risk or damaging the tower.

In further exemplary embodiments, the safety features may include features that reduce the apparent weight of the modular robotic component 52. For example, the safety features may include, for example a tensioning system, such as a spring tensioning system, or a counterweight for offsetting the weight of the modular robotic component 52. Further, the tensioning system or counterweight may, in some embodiments, increase the force applied to offset the weight of the modular robotic component 52 as the modular robotic component 52 moves up the cables 56 or to offset the weight of any tethered cables, such as tether cable 80, including wires, conduits, or additional umbilical cords that are associated with the vertical, external, self-rappelling system 10.

Referring now to FIGS. 3 and 4, illustrated is an embodiment of the wind turbine 10 in which the modular robotic component 52 is utilized for leading edge erosion repair. In this particular embodiment, the modular robotic component 52 is comprised of a first module 90, a second module 92, a third module 94, a fourth module 96, a fifth module 98 and a sixth module 100, each providing any necessary tasks for repair of a leading edge 23 of the blade 22, such as previously described with regard to FIGS. 1 and 2. In this particular embodiment, the modular robotic component 52 is positioned proximate the wind turbine 10, and more specifically the blade 22, without the need for the vertical, external, self-rappelling system 54 (FIGS. 1 and 2). More particularly, the modular robotic component 52 may be positioned manually or through the use of pilot lines 102, or the like.

Figure 5:
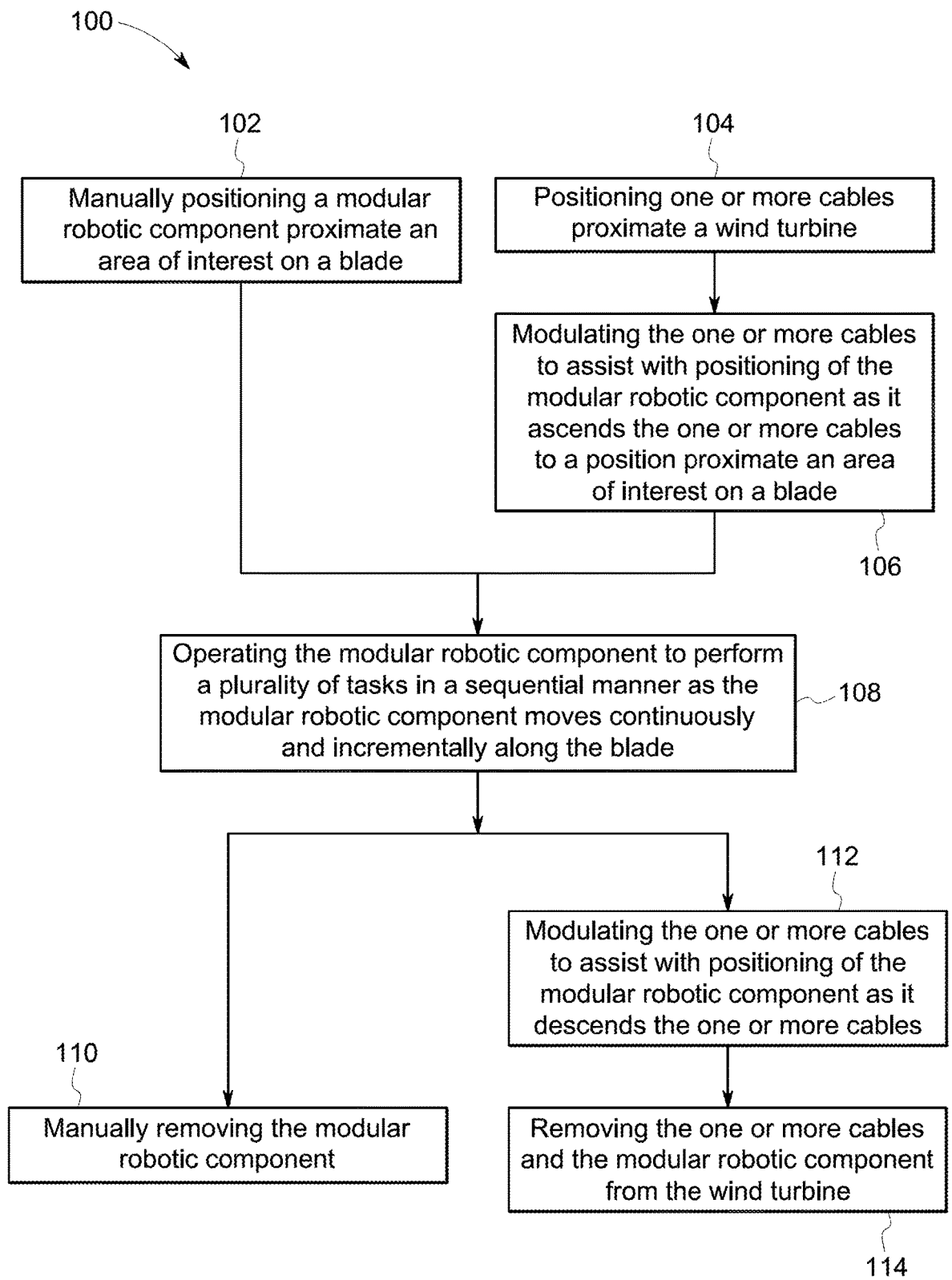
FIG. 5 illustrating an exemplary method for wind blade inspection, repair and upgrade, in accordance with one or more embodiments of the present disclosure.

Referring now to FIG. 5, the present disclosure is further directed to a method 100 for inspecting, repairing and/or upgrading a wind turbine for indications, such as the blade or other components of the wind turbine for indications. The method may include, for example, manually positioning a modular robotic component proximate an area of interest on a blade, in an initial step 102. Alternatively, one or more cables may be initially positioned proximate the wind turbine to assist with the step of positioning the modular robotic component, in a step 104. The one or more cables are then modulated to position the modular robotic component as it ascends the one or more cables to a position proximate an area of interest on the blade, in a step 106.

Next, in a step 108, the modular robotic component is operated to perform a plurality of tasks in a sequential manner as the modular robotic component moves continuously and incrementally along a surface of the wind turbine. The tasks are performed by at least two modules that comprise the modular robotic component. Subsequent to completion of all tasks, or at a desired time, the modular robotic component is manually removed from the wind turbine, in a step 110. Alternatively, the one or more cables are modulated, in a step 112, to position the modular robotic component as it descends the one or more cables. Upon the modular robotic component reaching the base location, the modular robotic component and the one or more cables are removed or disengaged from the wind turbine, in a step 114.

As discussed above, the wind turbine 10 of the present disclosure may include a tower 12 and at least one rotor blade 22. In exemplary embodiments, the modular robotic component 52 may be operated to inspect, repair and/or upgrade a surface of the wind turbine 10, and more particularly a surface of the rotor blade 22, or alternatively the tower 12 or other wind turbine 10 component, for indications 40.

In further exemplary embodiments, the method of the present disclosure may include various steps involving positioning the rotor blade 22 prior to positioning of the modular robotic component 52. For example, the method may include the step of rotating the rotor blade 22 such that the rotor blade 22 is approximately parallel to and proximate the tower 12. For example, the rotor blade 22 may be rotated about the axis of rotation 32 (FIG. 1) until the rotor blade 22 is in a generally downward position. The rotor blade 22 may then be rotated and positioned such that it is approximately parallel to the tower 12. Thus, the modular robotic component 52 disposed on the wind turbine 10 may be in an optimal position for inspecting the rotor blade 22.

The method may further include the step of rotating the nacelle 16 about the yaw axis 26. For example, while the modular robotic component 52 of the present disclosure may advantageously inspect, repair and/or upgrade a rotor blade 22 in a wide variety of environmental conditions, the use of incident light to inspect the rotor blade 22 may still be beneficial. Thus, if incident light is available, or if other desired conditions are present, the nacelle 16 may be rotated about the yaw axis 26 to optimally position the rotor blade 22 as desired.

The method may further include the step of rotating the rotor blade 22 about the pitch axis 34. For example, a rotor blade 22 of the present disclosure may include a pressure side, a suction side, a leading edge, and a trailing edge, as is known in the art. Each side and edge of the rotor blade 22 must be inspected, repaired and/or upgraded. To achieve such, the side or edge must be in the line-of-sight of the modular robotic component 52. For example, when the rotor blade 22 is positioned such that the pressure side, leading edge, and trailing edge are in the line-of-sight of the modular robotic component 52, the suction side may not be analyzed. Thus, during the inspection, repair and/or upgrade of the rotor blade 22 by the modular robotic component 52, after analyzing portions of the rotor blade 22 that are in the line-of-sight of the modular robotic component 520, the rotor blade 22 may be rotated about the pitch axis 34 such that other portions of the rotor blade 22 are placed in the line-of-sight of the modular robotic component 52. The modular robotic component 52 may then continue to inspect, repair and/or upgrade the rotor blade 22.

It should be understood that the modular robotic component 52 and method of the present disclosure may be optimized for fast, efficient inspection, repair and/or upgrade of a wind turbine 10. For example, the modular robotic component 52 and method of the present disclosure may be utilized to quickly and efficiently inspect, repair and/or upgrade the various rotor blades 22 of a wind turbine 10. Additionally, it should be understood that the modular robotic component 52 and method of the present disclosure eliminate human intervention and reduce human errors previously associated with the inspection, repair and/or upgrade of wind turbines 10. Further, it should be understood that the modular robotic component 52 and method of the present disclosure can perform in a wide variety of environmental conditions.

Exemplary embodiments of the system for inspecting, repairing and upgrading a wind turbine, and more particularly the modular robotic component is described in detail above. The modular robotic component is not limited to use with the specified land-based wind turbines described herein, but rather, the modular robotic component 52 can be utilized with off-shore wind turbines. In such an off-shore application, the base location may include a manned or unmanned ocean-based vehicle, or the like. Moreover, the present disclosure is not limited to the embodiments of the modular robotic component, system and method described in detail above. Rather, other variations of the modular robotic component, system and method may be utilized within the spirit and scope of the claims.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method comprising:
    positioning a modular robotic component proximate an area of interest on a surface of a wind turbine, the modular robotic component comprising a plurality of modules that perform a plurality of tasks;
    inspecting the area of interest with the modular robotic component for an indication requiring at least one of repair or upgrade;
    operating the modular robotic component to perform the plurality of tasks sequentially as the modular robotic component moves along the surface of the wind turbine;
    wherein positioning the modular robotic component comprises:
        positioning one or more cables proximate the wind turbine, the cables anchored to a base location proximate the wind turbine; and
        modulating the one or more cables to assist with positioning of the modular robotic component as it ascends the one or more cables to a position proximate the area of interest and descends the one or more cables.

2. The method as claimed in claim 1, wherein positioning the modular robotic component comprises positioning an access module comprising a drive mechanism to drive the modular robotic component along the surface of the wind turbine.

3. The method as claimed in claim 2, wherein inspecting the area of interest with the modular robotic component comprises inspecting with an inspection module coupled to the access module, the inspection module comprising one or more sensors.

4. The method as claimed in claim 3, wherein operating the modular robotic component to perform the plurality of tasks comprises positioning at least one additional module coupled to the inspection module, each additional module performing at least one task of the plurality of tasks.

5. The method as claimed in claim 1, wherein operating the modular robotic component to perform a plurality of tasks comprises operating one or more coordinated base located robots disposed at a base location and anchored to the one or more cables to position the modular robotic component relative to the wind turbine.

6. The method as claimed in claim 1, wherein the step of positioning the modular robotic component comprises manual positioning.

7. The method as claimed in claim 1, wherein the plurality of tasks comprise cleaning, sanding, filling, curing, taping and coating.

8. The method as claimed in claim 1, wherein the modular robotic component comprises:
an access module comprising a drive mechanism to drive the modular robotic component along the surface of the wind turbine;
an inspection module coupled to the access module, the inspection module comprising one or more sensors to inspect the surface of the wind turbine and validate the area of interest on the surface of a wind turbine; and
at least one additional module coupled to the inspection module, each module of the at least one additional module performing one of the plurality of tasks,
the access module, the inspection module and the at least one additional module cooperatively engaged to enable movement along the surface of a wind turbine.

9. The method as claimed in claim 1, wherein the surface of the wind turbine is a blade surface of the wind turbine.

10. A system comprising:
one or more cables positioned in draping engagement with a portion of a wind turbine, each of the one or more cables anchored to a base location at opposing ends; and
a modular robotic component configured to ascend the one or more cables to a position proximate an area of interest on a surface of the wind turbine, the modular robotic component comprising:
an access module comprising a drive mechanism to drive the modular robotic component along the surface of a wind turbine;
an inspection module coupled to the access module, the inspection module comprising one or more sensors to inspect the surface of the wind turbine and validate the area of interest on the surface of the wind turbine; and
at least one additional module coupled to the inspection module, each module of the at least one additional module configured to perform a task,
the access module, the inspection module and the at least one additional module cooperatively engaged to enable movement along the surface of the wind turbine to sequentially perform the tasks at an indication.

11. The system as claimed in claim 10, further comprising at least one slave robot system disposed at the base location and anchored to the one or more cables, the at least one slave robot system configured to position the modular robotic component relative to the wind turbine.

12. The system as claimed in claim 10, wherein the one or more cables are positioned in draping engagement with at least one of a hub, a nacelle and a rotor blade of the wind turbine.

13. The system as claimed in claim 10, further comprising a tether cable anchored to the modular robotic component and the base location, wherein the tether cable is configured to provide one or more of power, communications, grounding, supplies and distance calculations.

14. The system as claimed in claim 10, wherein the tasks comprise at least one of repairing the indication and upgrading the wind turbine.

15. A modular robotic component comprising:
an access module comprising a drive mechanism to drive the modular robotic component along a surface of a wind turbine;
an inspection module coupled to the access module, the inspection module comprising one or more sensors to perform a task of inspecting the surface of the wind turbine and validate an area of interest on the surface of the wind turbine;
at least one additional module coupled to the inspection module, the at least one additional module configured to perform an additional task,
the access module, the inspection module and the at least one additional module cooperatively engaged in an end-to-end train configuration to enable sequential movement along the surface of the wind turbine such that the access module moves past and pulls the inspection module to an indication at the area of interest to perform the inspection task, and the access module and inspection module subsequently move further on the surface of the wind turbine to pull the at least one additional module to the indication to perform the additional task at the indication on the surface of a wind turbine as the modules move sequentially past the indication; and
wherein the modular robotic component is configured to ascend one or more cables that are anchored to a base location to a position proximate to the indication and to descend the cables subsequent to performance of the tasks.

16. The modular robotic component as claimed in claim 15, wherein the access module further comprises a built-in camera to provide access to the area of interest.

17. The modular robotic component as claimed in claim 15, wherein the inspection module comprises one or more sensors for at least one of visual sensing and ultrasonic-based non-destructive testing (NDT).

18. The modular robotic component as claimed in claim 15, wherein the at least one additional module comprises at least one of a cleaning module, a sanding module, a filling module, a curing module, a taping module and a coating module.

19. The modular robotic component as claimed in claim 15, wherein the tasks comprise at least one of repairing the indication and upgrading the wind turbine.

20. The modular robotic component as claimed in claim 15, further comprising a tether cable providing one or more of power, communications, grounding, supplies and distance calculations.

21. The modular robotic component as claimed in claim 15, wherein the surface of the wind turbine is a blade surface of the wind turbine.

* * * * *